United States Patent [19]

Tanahashi et al.

[11] 4,287,541

[45] Sep. 1, 1981

[54] CASSETTE LOADING DEVICE FOR A CASSETTE RECORDING APPARATUS

[75] Inventors: Makoto Tanahashi, Yokohama; Hisashi Yamauchi, Tokyo; Takeshi Yamamoto, Yokohama, all of Japan

[73] Assignee: Sony Corporation, Tokyo, Japan

[21] Appl. No.: 43,734

[22] Filed: May 30, 1979

[30] Foreign Application Priority Data

May 29, 1978 [JP] Japan .............................. 53-71699[U]

[51] Int. Cl.³ ...................... G11B 15/68; G11B 23/04
[52] U.S. Cl. ..................................... 360/92; 360/72.1
[58] Field of Search .............................. 360/92, 71–72; 274/1 R, 17

[56] References Cited

U.S. PATENT DOCUMENTS

| | | | |
|---|---|---|---|
| 3,852,819 | 12/1974 | Staar | 360/92 |
| 3,879,758 | 4/1975 | Pyles | 360/92 |
| 3,996,617 | 12/1976 | Cousino | 360/92 |
| 4,075,669 | 2/1978 | Louzil et al. | 360/92 |

FOREIGN PATENT DOCUMENTS

1202383 8/1970 United Kingdom ..................... 360/92

*Primary Examiner*—John H. Wolff
*Attorney, Agent, or Firm*—Lewis H. Eslinger; Al Sinderbrand

[57] ABSTRACT

A cassette loading device for a cassette recording apparatus includes a cylindrical cassette magazine having a plurality of radially directed slots, each adapted to contain a tape cassette, and narrow slits along the circumferential periphery thereof for receiving paper slips, each slip having information thereon concerning the recording of a tape cassette in a respective slot; a drive device for intermittently rotating the cassette magazine so that the radially directed slots are successively disposed at a cassette loading position; a detecting apparatus for detecting the presence of a paper slip in the slit which is retarded by one step with respect to the slit corresponding to the radially directed slot at the cassette loading position and for generating an output signal in response thereto; and a circuit responsive to the output signal for preventing the intermittent rotation of the cassette magazine by the drive device.

12 Claims, 7 Drawing Figures

CASSETTE LOADING DEVICE FOR A CASSETTE RECORDING APPARATUS

BACKGROUND OF THE INVENTION

This invention relates generally to a cassette loading device for a cassette recording apparatus and, more particularly, is directed to an improved cassette loading device for a cassette recording apparatus, which is especially suited for use as an automatic cassette changer in, for example, a telephone dictating machine.

There presently exist various types of cassette recording apparatus and cassette loading devices therefor. One such loading device includes a cylindrical cassette magazine having a plurality of radially directed slots, each adapted to contain a tape cassette, and also having narrow slits along the circumferential periphery of the magazine for receiving paper slips, each slip having information thereon concerning the recording of a tape cassette in the respective slot, such as information relating to the recording time, the person who made the recording, and the like. The cassette magazine is intermittently rotated such that the radially directed slots are successively disposed at a cassette loading position so that the cassette therein can be loaded into the recording apparatus.

Such devices typically include an arm or lever extending into the radially directed slot at the cassette loading position for engaging the cassette therein and loading the same into the recording apparatus. However, because the paper receiving slits are typically in radial alignment with the radially directed slots, the lever, when extending into the radially directed slot at the cassette loading position, also will engage any paper slip within the corresponding slit. Thus, if a printed paper slip for a previously recorded cassette has not been removed from the slit which rotates to the cassette loading position, the paper slip will also be fed by the lever to the tape recorder, causing various problems with the tape recording apparatus.

OBJECTS AND SUMMARY OF THE INVENTION

Accordingly, it is an object of this invention to provide a cassette loading device for a cassette recording apparatus that avoids the above-described difficulties encountered in such devices.

More particularly, it is an object of this invention to provide a cassette loading device for a cassette recording apparatus of the type having a magazine, in which the presence of a previously printed paper slip in a slit corresponding to a respective cassette receiving section of the magazine, which section is at the cassette loading position, is prevented.

Another object is to provide a cassette loading device for a cassette recording apparatus having an intermittently movable magazine, as aforesaid, in which the presence of a paper slip in a slit which is retarded with respect to another slit corresponding to the cassette receiving section then at the cassette loading position, is detected and the cassette magazine is prevented from further intermittent movement until such paper slip is removed from its respective paper receiving slit.

In accordance with an aspect of this invention, a cassette loading device for a cassette recording apparatus includes a cassette magazine with a plurality of cassette receiving sections, each adapted to contain a tape cassette and respective slip receiving sections for receiving paper slips, each with information thereon concerning the recording of a tape cassette in the respective cassette receiving section, drive means for intermittently moving the cassette magazine so as to successively dispose the cassette receiving sections at a cassette loading position, means for detecting the presence of a paper slip in a slip receiving section which is retarded, considered in the direction of the intermittent movement, with respect to the slip receiving section corresponding to the cassette receiving section then at the cassette loading position and for generating an output signal in response thereto, and means responsive to the output signal for preventing the intermittent movement of the cassette magazine by the drive means.

The means for detecting and generating preferably includes a light source for directing light into the one slip receiving section and a photosensor for detecting light reflected therefrom and for generating the output signal; and the means responsive to the output signal preferably includes a latch circuit for deactivating the drive motor for the cassette magazine when a paper slip is present in the one of the slip receiving sections.

The above, and other objects, features and advantages of the invention, will be apparent from the following detailed description of the illustrative embodiment of the invention which is to be read in connection with the accompanying drawings.

DETAILED DESCRIPTION OF THE PREFERRED EMBODIMENT

Figure 1:
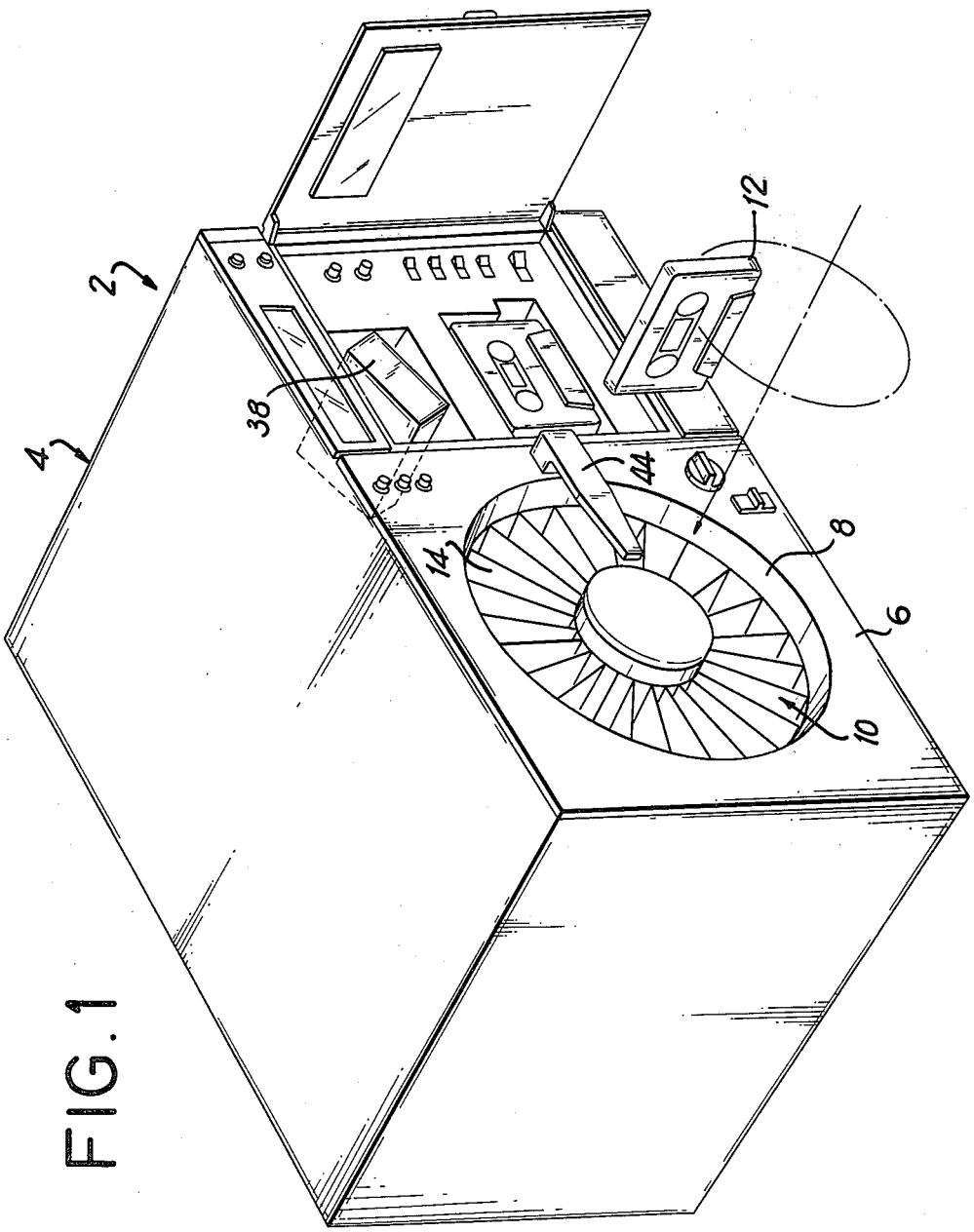
FIG. 1 is a perspective view of a cassette recording apparatus having a cassette loading device associated therewith.

Referring to the drawings in detail, and initially to FIG. 1 thereof, there is illustrated a cassette recording assembly 2 including a substantially rectangular housing 4 having a front wall 6 with a circular aperture 8 therein. The cassette recording assembly is provided with a cassette loading device, which includes a cylindrical cassette magazine 10 mounted so as to be co-axially aligned with circular aperture 8, and within which a plurality of tape casettes 12 are adapted to be loaded through aperture 8.

Figure 2:
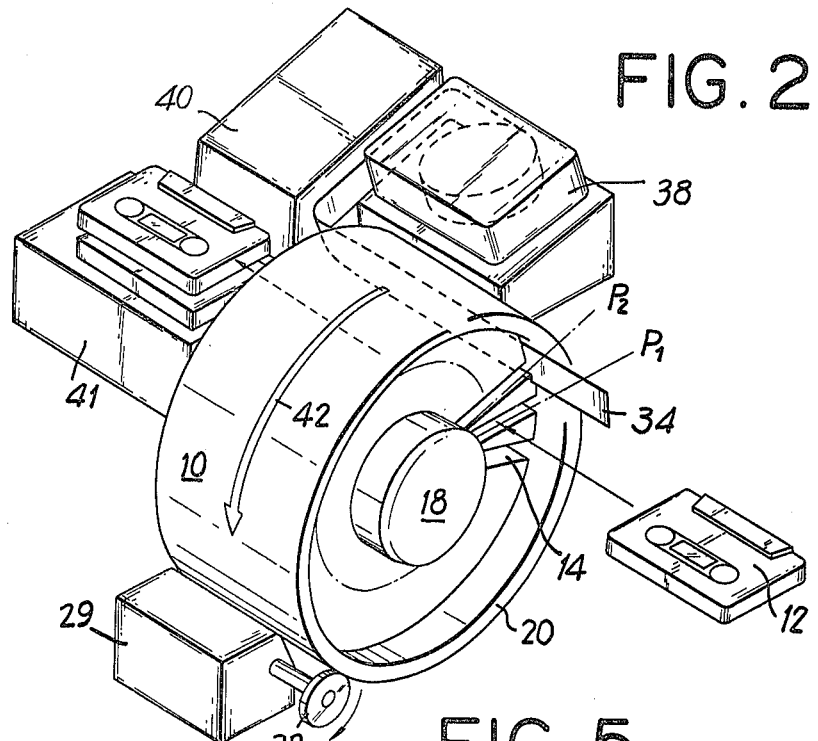
FIG. 2 is a schematic perspective view of the cassette loading device of FIG. 1.
Figure 3:
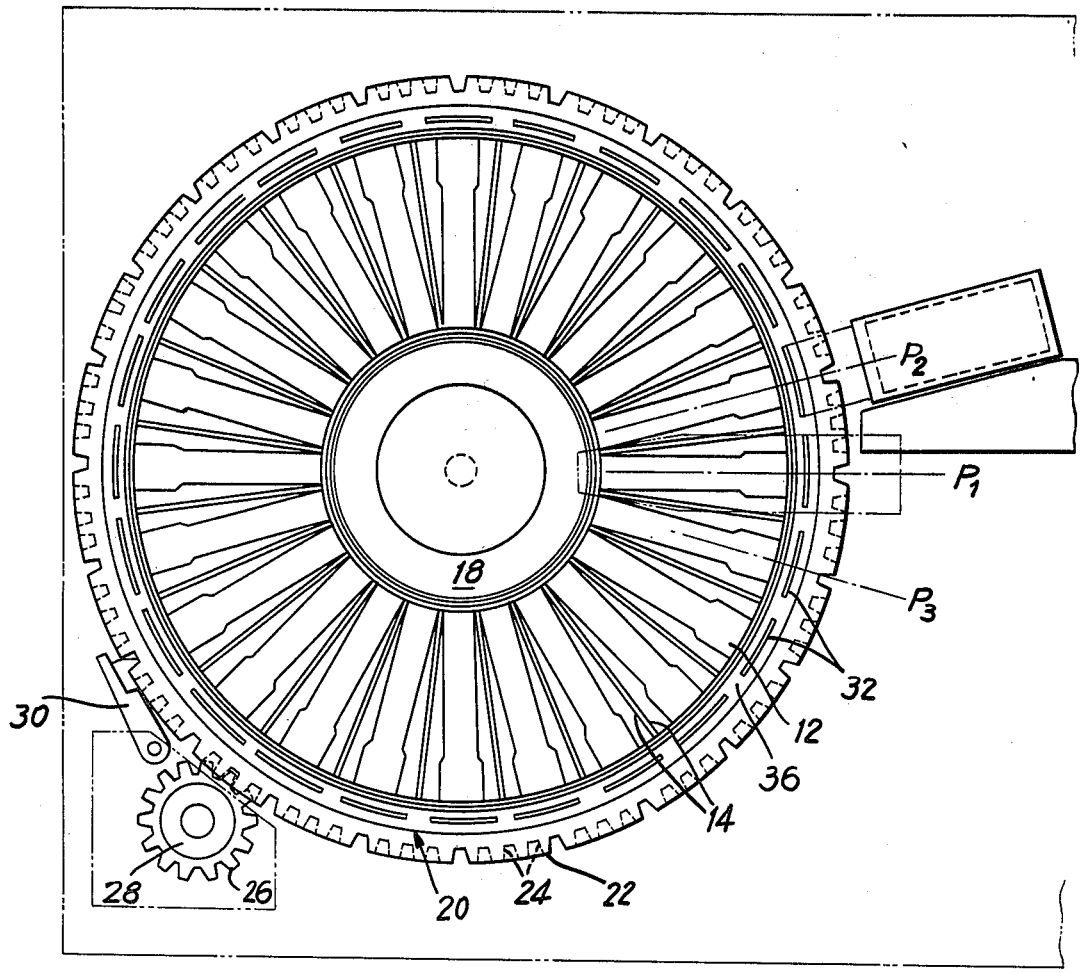
FIG. 3 is a front plan view of the cassette magazine employed in the loading device of FIG. 2.
Figure 4:
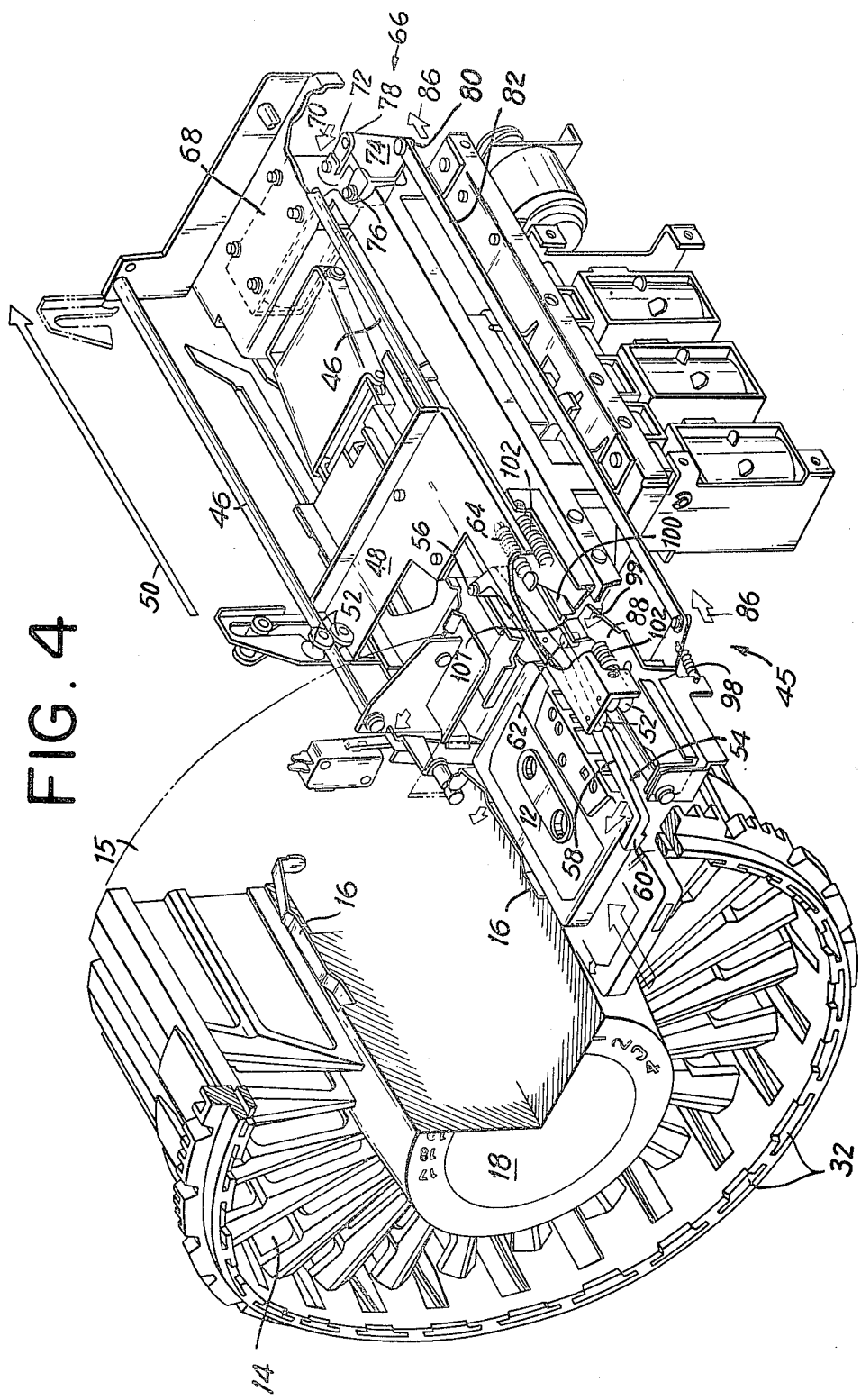
FIG. 4 is a partially broken away, perspective view of the cassette loading device of FIG. 1.

Referring to FIGS. 1 and 3, cylindrical cassette magazine 10 includes a plurality of cassette receiving sections 14 in the form of radially directed slots, each adapted to receive and store a tape cassette 12 and each extending through the entire magazine 10 in the axial direction thereof. Each cassette receiving section 14 preferably includes a biasing leaf spring 16, as shown in FIG. 4, for securely retaining the cassettes 12 within the cassette receiving sections 14. Magazine 10 further includes an axial center section 18, for rotatably mounting the magazine within housing 4 of cassette recording assembly 2, and an outer peripheral section 20, with the radially directed slots 14 being radially disposed between axial center section 18 and outer peripheral section 20. Outer peripheral section 20 has an outer circumferential surface 22 having a plurality of spaced teeth 24 which mate with corresponding teeth 26 of a magazine driving pinion 28, as shown in FIGS. 2 and 3. In addition, a biased pawl 30 preferably is disposed adjacent outer circumferential surface 22 to mate with teeth 24 thereof for restraining magazine 10 to rotate in only a single direction.

As shown in FIGS. 2 and 3, outer peripheral section 20 of magazine 10 also includes a plurality of slip receiving sections 32 for receiving paper slips 34, each with information thereon, such as the recording time, the person who made the recording, and the like, concerning the recording of a tape cassette 12 in the respective cassette receiving section 14 which is aligned radially with the section 32 containing the slip 34 in question. Paper slip 34 may be, for example, heat-sensitive recording paper. Each slip receiving section 32 preferably is defined by a narrow slit disposed along a circumferential section 36 of outer peripheral section 20 of cassette magazine 10, with each slit 32 being in radial alignment with a corresponding one of the radially directed slots 14. Each of slits 32 also extends through the entire outer peripheral section 20 in the axial direction. As shown in FIGS. 1 and 2, paper slips 34 are supplied by a paper tape cartridge 38 past a heat-sensitive printer 40 which prints information such as the identity of the person dictating a message, the amount of dictated time and the like, on the paper tape. The paper tape then is cut into a slip 34 of suitable length and is inserted within the appropriate slip receiving section 32.

As shown in FIG. 1, the recording assembly further includes a radially directed arm 44 attached to front wall 6 of housing 4 in the vicinity of the outer periphery of circular aperture 8, the arm extending radially inward towards axial center section 18 of magazine 10 at a cassette loading position $P_1$ (FIG. 2), which corresponds to the position at which each cassette is removed from magazine 10 and loaded into the recording apparatus. Thus, arm 44 prevents inadvertent loading of a second cassette 12 in the cassette receiving section 14 then at cassette loading position $P_1$, when a cassette 12 already assigned to that cassette receiving section is in the tape recorder section 41 of recording assembly 2. Thus, the cassette 12 assigned to cassette receiving section 14 but then at cassette loading position $P_1$ is free to return to this section 14 after recording on the cassette is complete. However, the loading and removal of the cassettes 12 into and from the cassette receiving sections 14 can be effected at any position other than cassette loading position $P_1$.

In addition, as shown in dot-dash lines on FIG. 4, a non-rotating restraining plate 15 of circular configuration is provided at the rear face of magazine 10 with an aperture (not shown) corresponding to a cassette receiving section 14, the aperture being located at cassette loading position $P_1$. In this manner, cassettes 12 are restrained from exiting through the rear portion of magazine 10, except at the cassette loading position $P_1$.

The relationship between recording apparatus 41 and the cassette loading device is schematically illustrated in FIG. 2. As seen therein, cassette magazine 10 is rotated in the direction of arrow 42 by magazine driving pinion 28, which is intermittently driven by drive motor 29. Magazine 10 thus is driven in a steplike manner so as to sequentially dispose successive cassette receiving sections 14 at cassette loading position $P_1$. Cassette 12 in the cassette receiving section 14 then at cassette loading position $P_1$ is automatically loaded from the section 14 into tape recorder 41, and after recording therein, this cassette is returned to the same cassette receiving section 14 which has remained at loading position $P_1$. Magazine 10 then is rotated in the direction of arrow 42 by one step, that is, by, for example, 15° for an embodiment wherein there are twenty-four cassette receiving sections 14, so that the next successive cassette receiving section 14 is disposed at cassette loading position $P_1$. This rotational movement of magazine 10 advances cassette 12, upon which a message was just recorded, to a paper slip receiving position $P_2$, which is seen to be one step in advance of cassette loading position $P_1$. At position $P_2$, a heat-sensitive paper tape having information printed thereon by heat-sensitive printer 40 is cut into a slip 34 of appropriate length and inserted within slip receiving section 32 corresponding to the cassette receiving section 14 which now is at position $P_2$. This slip will be removed from magazine 10 when the respective cassette 12 is removed from the magazine so as to be transcribed, and provides useful information relating to the messages which have been recorded on this cassette.

It is to be noted from FIG. 4 that each cassette receiving section 14 and the respective, radially aligned slip receiving section 32 are open along an axial segment thereof so as to permit a cassette loading mechanism to extend radially through a section 32 and thus engage a cassette 12 stored in the respective section 14 which then is disposed at cassette loading position $P_1$.

The cassette loading mechanism 45 which is adapted to load the cassette disposed within the one cassette receiving section 14 located at the cassette loading position $P_1$ into the cassette recording apparatus will now be described with reference to FIGS. 4 and 5. The mechanism 45 includes a pair of guide rails 46 fixedly mounted within housing 4 and a carriage assembly 48 slidably mounted on guide rails 46 by rollers 52 for movement in the direction of arrow 50, as shown in FIG. 4. Cassette loading mechanism 45 also includes a loading lever or arm 54 pivotally attached to carriage assembly 48 by pivot pin 56. Loading lever 54 is comprised of a first arm portion 58 which is attached to pivot pin 56 at one end thereof and which has a hook end portion 60 at its opposite end. A tension spring 64 biases loading lever 54 about pivot pin 56 so that the loading lever is urged away from cassette 12; whereby loading lever 54, and more particularly, hook portion 60 thereof, normally does not engage cassette 12.

The cassette loading mechanism further includes a loading lever actuation device 66 comprised of a solenoid 68 whose armature is adapted to be depressed in the direction of arrow 70, (FIG. 5) and an interlocking rod 82 coupled to the solenoid. A tie rod 72 is connected at one end to the armature of solenoid 68, and at its other end to a corner 78 of a translation conversion lever 74 of substantially triangular configuration and having another corner 76 pivotally fixed to housing 4 and a third corner 80 attached to elongated interlocking rod 82. When the armature of solenoid 68 is depressed in the direction of arrow 70, conversion lever 74 rotates in the direction of arrow 84 around corner 76, thus driving interlocking rod 82 in the direction of arrow 86. The opposite end of interlocking rod 82 is pivotally connected to a forcing lever 88 by pivot pin 92. The forcing lever is, in turn, pivotally fixed to housing 4 by pivot pin 90. Forcing lever 88 includes a connecting portion 94 connected at opposite ends to pivot pins 90 and 92, respectively, and an actuation portion 96 connected to connecting portion 94 at pivot pin 90. Actuation portion 96 normally is biased out of contact with loading lever 54 by means of a tension spring 98 connected to connecting portion 94.

Cassette loading mechanism 45 includes another guide rail 100 fixedly mounted within housing 4 for guiding a pin 62 which is secured to an outer portion of loading lever 54. A tension spring 102, attached at one end to carriage 48 and at its opposite end to housing 4, urges carriage 48 in the direction of the arrow 50 on FIG. 4.

Figure 5:
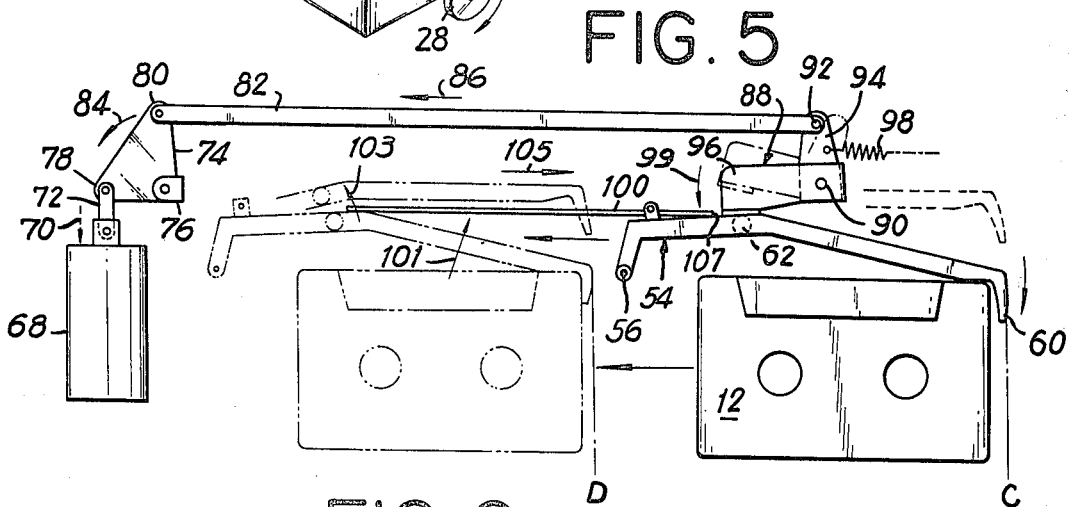
FIG. 5 is a top plan view of the cassette loading mechanism of FIG. 4 for loading the cassette at the cassette loading position into the recording apparatus.

In operation, just prior to a cassette 12 being loaded into the recording apparatus, solenoid 68 is in an inactive state and, accordingly, spring 98 biases forcing lever 88 to the position shown in broken lines in FIG. 5. Also, spring 64 biases loading lever 54 out of engagement with cassette 12. Further, carriage assembly 48, and loading lever 54, which is pivotally attached thereto, are restrained from being in the direction of arrow 50 by spring 102 since pin 62 engages against the free end 107 of guide rail 100. When a cassette 12 at cassette loading position $P_1$ is to be loaded into the recording apparatus, solenoid 68 is actuated, thus driving interlocking rod 82 in the direction of arrow 86. This rotates forcing lever 88 about pivot pin 90 whereby actuation portion 96 thereof contacts pin 62 of loading lever 54 to pivot the loading lever, and more particularly, the hook end portion 60 thereof, about pivot pin 56 into contact with cassette 12. At the same time, carriage 48, which has loading lever 54 attached thereto, no longer is restrained by pivot pin 62, and accordingly, tension spring 102 urges carriage 48, loading lever 54 and cassette 12 to move in the direction of arrow 50, with guide rail 100 guiding pin 62 of the loading lever therealong. Accordingly, cassette 12 is moved from position C to position D by loading lever 54, as shown in FIG. 5. It is to be noted that while spring 102 urges carriage 48, loading lever 54 and cassette 12 in the direction of arrow 50, spring 64 urges pin 62 of loading lever 54 into engagement with guide rail 100 to be guided therealong. Solenoid 68 is adapted to be energized only for about 1 to 2 seconds. When the solenoid is de-energized, forcing lever 88 returns to its original position under the influence of tension spring 98 so as to allow loading lever 54 to be reset to its original position in the direction of arrows 101, 103 and 105 by any suitable means, such as a spring or the like, after the cassette has been moved to position D where pin 62 clears guide rail 100 and is released therefrom.

Figure 6:
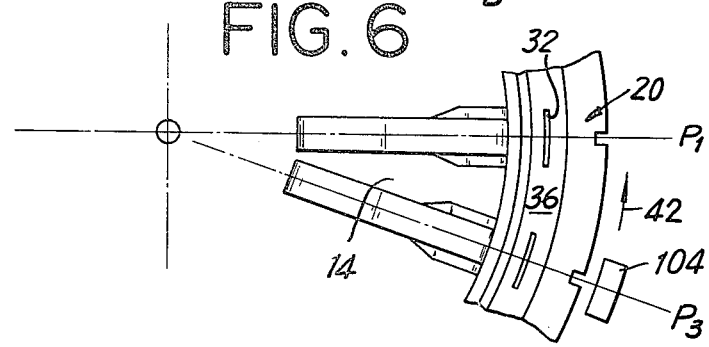
FIG. 6 is a partial schematic, sectional view of a portion of the cassette magazine and the detecting means according to the present invention.
Figure 7:
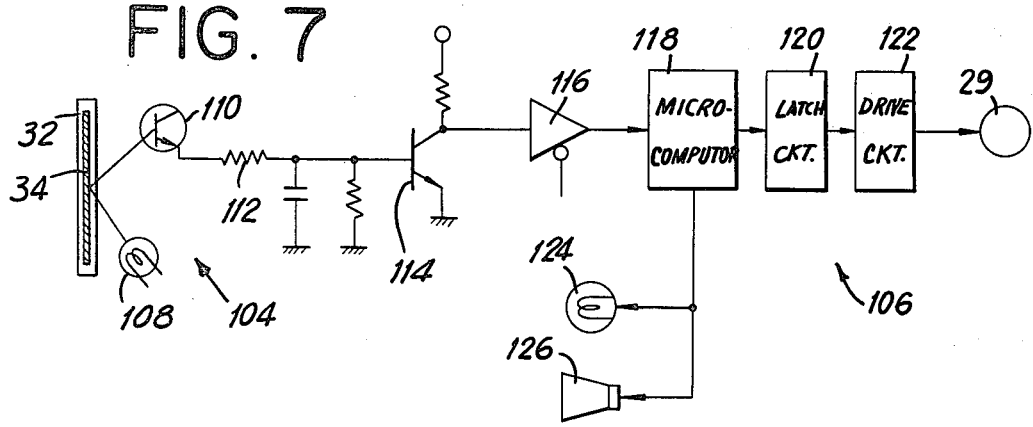
FIG. 7 is a schematic, partial block diagram of the detecting means and means responsive thereto, according to the present invention.

It is seen that if a paper slip 34 is disposed within slip receiving section 32 that is at cassette loading position $P_1$ at the same time that a cassette at this position is being loaded, loading lever 54 also will engage the paper slip and feed the same to the tape recorder along with cassette 12. To avoid this undesired occurrence, the present invention is adapted the sense to presence of a paper slip in a slip receiving section 32 which is sequentially retarded by one step from the slip receiving section 32 then at cassette loading position $P_1$ and to prevent the rotation of cassette magazine 10 in the event that a paper slip is sensed. One embodiment of a device according to the present invention is shown in FIGS. 6 and 7 and includes a detector 104 for detecting the presence of a paper slip 34 in the slip receiving section 32 which is at a position $P_3$, this position $P_3$ being retarded by one cassette receiving portion from the cassette loading position $P_1$, and for generating an output signal in response thereto. A circuit 106 is responsive to this output signal for preventing further movement of cassette magazine 10 by the drive motor 29, thereby preventing the detected paper slip from reaching cassette loading mechanism 45. More particularly, detector 104 includes a light source 108, such as a lamp or the like, for directing light into slip receiving section 32 at position $P_3$, and a photosensor, such as a phototransistor 110, for detecting the light reflected from the slip receiving section and for generating an output signal as a function of the amount of light which is reflected. When a paper slip 34 is disposed in slip receiving section 32 at position $P_3$, the amount of reflected light will exceed a predetermined threshold. If a slip of paper tape is not present in the slip receiving section, the amount of light reflected to phototransistor 32 is less than this threshold.

The output signal from phototransistor 110 is supplied through a resistor 112 and a filter circuit to a transistor 114, shown to be an NPN transistor connected in common-emitter configuration. Transistor 114 is activated to its conductive, or ON state when the output signal supplied from phototransistor 110 exceeds a turn-on threshold level. When transistor 114 is turned ON, an output therefrom is supplied through a gate circuit 116 to a microcomputer 118 which controls various operations of the cassette loading device. The microcomputer responds to the ON state of transistor 114 to energize a latch circuit 120, such that, when phototransistor 110 detects the presence of a paper slip 34, latch circuit 120 is energized. This, in turn, controls a drive circuit 122 to interrupt the energization of cassette magazine drive motor 29 so as to prevent further rotation of the cassette magazine. Thus, potential problems which may be caused by loading an unremoved slip to the tape recorder are avoided. At the same time, microcomputer 118 operates to illuminate a warning lamp 124 and an audible alarm 126, such as a buzzer or the like, to inform an operator that a slip 34 has remained in slit 32.

When slip 34 is removed from slit 32 at position $P_3$, or when no slip is present therein, latch circuit 120 permits drive circuit 122 to drive cassette magazine drive motor 29 so that the latter intermittently rotates cassette magazine 10. Both lamp 124 and buzzer 126 are de-energized at this time.

It should be realized that the present invention is not limited solely to the utilization of a cylindrical cassette magazine but may be utilized with any other suitable magazine. For example, an elongated box-like tray or magazine may be utilized which is intermittently moved in a linear direction past the cassette loading position $P_1$.

Having described a specific preferred embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. A cassette loading device for a cassette recording apparatus, said cassette loading device having cassette magazine with a plurality of cassette receiving sections each adapted to contain a tape cassette and a plurality of slip receiving sections each aligned with a respective one of said cassette receiving sections and communicating with the latter for receiving an information slip with information thereon concerning the recording of a tape cassette in said respective cassette receiving section, drive means for intermittently moving said cassette magazine so as to successively dispose said cassette receiving sections at a cassette loading position, and a cassette loading mechanism adapted to enter the one cassette receiving section at said loading position through the respective slip receiving section for loading a tape cassette from said one cassette receiving section into the cassette recording apparatus; said device further comprising:

means for detecting the presence of an information slip in a slip receiving section which is in immediately trailing relation, considered in the direction of intermittent movement of said cassette magazine, in respect to the slip receiving section corresponding to the cassette receiving section then at said cassette loading position and for generating an output signal in response thereto; and means responsive to said output signal for preventing further movement of said cassette magazine by said drive means upon detection of an information slip in said slip receiving section which is in said immediately trailing relation.

2. A cassette loading device according to claim 1; in which said means for detecting and generating includes a light source for directing light to said trailing slip receiving section, and means for detecting light reflected from said slip receiving section to generate said output signal in response to a predetermined amount of reflected light, the amount of reflected light being affected by the presence of an information slip in said trailing slip receiving section.

3. A cassette loading device according to claim 2; in which said means for detecting the amount of light and for generating said output signal comprises a photosensor.

4. A cassette loading device according to claim 3; in which said photosensor is a phototransistor which is activated to an ON state in response to the reflection of light from an information slip in said trailing slip receiving section.

5. A cassette loading device according to claim 1; in which said means for preventing further movement of the magazine includes a latch circuit energized in response to said output signal for deactivating said drive means when said information slip is present in said trailing slip receiving section.

6. A cassette loading device according to claim 5; in which said drive means includes a drive motor for advancing said cassette magazine and a drive circuit for energizing said drive motor, and wherein said latch circuit controls said drive circuit to interrupt the energization of said drive motor when said information slip is present in said trailing slip receiving section.

7. A cassette loading device according to claim 1; further including indicator means responsive to said output signal for indicating when said information slip is present in said trailing slip receiving section.

8. A cassette loading device according to claim 7; in which said indicator means includes a light source that is illuminated when the presence of said information slip in said trailing slip receiving section is detected.

9. A cassette loading device according to claim 7; in which said indicator means includes audible alarm means which is energized when the presence of said information slip in said trailing slip receiving section is detected.

10. A cassette loading device according to claim 1; in which said information slip is of heat-sensitive material adapted to have said information printed thereon by a heat-sensitive printer.

11. A cassette loading device according to claim 1; in which said cassette magazine is of cylindrical configuration and has a central axis about which it is intermittently rotated, said cassette receiving sections defining radially directed slots within said cassette magazine and said slip receiving sections defining relatively narrow slits disposed along a circumference of said cassette magazine, each slit being in radial alignment with a corresponding one of said radially directed slots.

12. A cassette loading device for a cassette recording apparatus, said cassette loading device having a cylindrical cassette magazine with a plurality of radially directed cassette receiving sections, each having an opening along an axial segment thereof and each adapted to contain a tape cassette, and a plurality of slip receiving sections each radially aligned with a respective one of said cassette receiving sections for receiving an information slip with information thereon concerning the recording of a tape cassette in the respective cassette receiving section, each said slip receiving section communicating with said respective cassette receiving section at said opening of the latter and further having an open portion along an axial segment thereof, and drive means for intermittently moving said cassette magazine angularly about its axis so as to successively dispose said cassette receiving sections one at a time at a cassette loading position; said device further comprising:

a cassette loading mechanism adapted to enter the one cassette receiving section then at said cassette loading position through said open portion of the respective slip receiving section and said opening of said one cassette receiving section for loading a tape cassette from within said one cassette receiving section then at said cassette loading position into said cassette recording apparatus;

means for detecting the presence of an information slip in a slip receiving section which is in immediately trailing relation, considered in the direction of intermittent movement of said cassette magazine, in respect to the slip receiving section corresponding to the cassette receiving section then at said cassette loading position and for generating an output signal in response thereto; and means responsive to said output signal for preventing further movement of said cassette magazine by said drive means, whereby to prevent said slip receiving section in said trailing relation from being moved to said cassette loading position and thereby avoiding lodging of any of said slips into said cassette recording apparatus by said cassette loading mechanism.

* * * * *